US006937807B2

(12) United States Patent
Franklin et al.

(10) Patent No.: US 6,937,807 B2
(45) Date of Patent: Aug. 30, 2005

(54) CABLE MANAGEMENT PANEL WITH SLIDING DRAWER

(75) Inventors: Michael J. Franklin, Apple Valley, MN (US); Jerome E. Maki, Richfield, MN (US); Trevor D. Smith, St. Louis Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 15 days.

(21) Appl. No.: 10/131,574

(22) Filed: Apr. 24, 2002

(65) Prior Publication Data

US 2003/0202765 A1 Oct. 30, 2003

(51) Int. Cl.$^7$ ................................. G02B 6/00
(52) U.S. Cl. ........................................ 385/134
(58) Field of Search ................................. 385/134–137

(56) References Cited

U.S. PATENT DOCUMENTS

| | | | |
|---|---|---|---|
| 4,373,776 A | * | 2/1983 | Purdy .......................... 385/135 |
| 4,792,203 A | | 12/1988 | Nelson |
| 4,820,007 A | | 4/1989 | Ross et al. |
| 4,840,449 A | | 6/1989 | Ghandeharizadeh |
| 4,898,448 A | | 2/1990 | Cooper |
| 4,995,688 A | | 2/1991 | Anton et al. |
| 5,066,149 A | | 11/1991 | Wheeler et al. |
| 5,142,607 A | | 8/1992 | Petrotta et al. |
| 5,209,572 A | | 5/1993 | Jordan |
| 5,240,209 A | | 8/1993 | Kutsch |
| 5,247,603 A | | 9/1993 | Vidacovich et al. |
| 5,323,480 A | | 6/1994 | Mullaney et al. |
| 5,339,379 A | | 8/1994 | Kutsch et al. |
| 5,363,466 A | | 11/1994 | Milanowski et al. |
| 5,367,598 A | * | 11/1994 | Devenish et al. ........... 385/135 |
| 5,497,444 A | | 3/1996 | Wheeler |
| 5,511,144 A | | 4/1996 | Hawkings et al. |
| 5,640,481 A | | 6/1997 | Llewellyn et al. |
| 5,802,237 A | | 9/1998 | Pulido |
| 5,887,106 A | | 3/1999 | Cheeseman et al. |
| 5,917,984 A | | 6/1999 | Roseler et al. |
| 5,946,440 A | | 8/1999 | Puetz |
| 6,009,224 A | * | 12/1999 | Allen .......................... 385/135 |
| 6,044,194 A | | 3/2000 | Meyerhoefer |
| 6,226,436 B1 | | 5/2001 | Daoud et al. |
| 6,236,795 B1 | | 5/2001 | Rodgers |
| 6,271,476 B1 | | 8/2001 | Bobowick et al. |
| 6,278,830 B1 | | 8/2001 | Levesque et al. |
| 6,307,999 B1 | | 10/2001 | Daoud |
| 6,321,017 B1 | | 11/2001 | Janus et al. |
| 6,351,159 B1 | | 2/2002 | Daoud |
| 6,396,989 B1 | | 5/2002 | Johnston et al. |
| 6,438,310 B1 | * | 8/2002 | Lance et al. ................ 385/135 |
| 2002/0054747 A1 | | 5/2002 | Foley |
| 2002/0160631 A1 | * | 10/2002 | Mendoza ..................... 439/65 |

FOREIGN PATENT DOCUMENTS

| | | |
|---|---|---|
| WO | WO95/07480 | 3/1995 |
| WO | WO96/10203 | 4/1996 |
| WO | WO 02/19005 | 3/2002 |

* cited by examiner

*Primary Examiner*—J F. Duverne
(74) *Attorney, Agent, or Firm*—Merchant & Gould P.C.

(57) ABSTRACT

An optical fiber cable management panel includes at least one slideable drawer and structure within the drawer for cable management and/or connection to other devices. At least two tray inserts drop into the drawers to provide the appropriate management and connection devices. Each of the drop-in plates includes fastener structure to accommodate removable securement of the drop-in plates to the drawer. The drop-in plates accommodate selected fiber management components thereon. The fiber management components can include radius limiters, adapters, or LEDs. A method of providing fiber management components in a cable management panel includes operably mounting at least two drop-in trays in a drawer, each of the drop-in trays including a fiber management component.

20 Claims, 6 Drawing Sheets

CABLE MANAGEMENT PANEL WITH SLIDING DRAWER

FIELD OF THE INVENTION

The present invention is concerned with management of optical fiber cables. The management device of the present invention has particular application in the telecommunications industry with respect to storage and/or connection of optical fiber cables with other cables and devices.

BACKGROUND OF THE INVENTION

Cable termination, splice and storage devices are known including, for example, devices shown in U.S. Pat. Nos. 4,792,203 and 5,946,440, both issued to ADC Telecommunications, Inc. Both of these patents concern devices with moveable trays for storage and management of the optical fiber cables. U.S. Pat. No. 5,066,149, also issued to ADC Telecommunications, Inc., concerns a cable management device including slideable drawers each including a cable slack take-up mechanism.

When moving the trays or drawers, unnecessary or excessive displacement of the optical fiber cables is undesirable. As the optical fiber cables are displaced, they are subject to bending and other forces. Bending of the fibers can cause attenuation and loss of signal strength. As a fiber bends, the fiber can also break, resulting in a loss of transmission through the fiber.

There is a continued need in the art for further cable management devices which address such concerns in the telecommunications industry as ease of use, size, reliability, cost, and protection of the fibers.

SUMMARY OF THE INVENTION

A cable management panel includes a chassis, and at least one drawer slideably mounted within the chassis. The drawer receives at least two drop-in plates, each including cable storage or cable connection structure for cables entering the panel.

Methods for changing a configuration of a fiber management drawer includes operably mounting at least two drop-in plates in a fiber management drawer, each of the drop-in plates including a desired combination of fiber management components. The method also includes removing at least one of the two drop-in plates and replacing it with a second, new drop-in plate with a different fiber management device configuration.

DETAILED DESCRIPTION OF THE PREFERRED EMBODIMENTS

Figure 1:
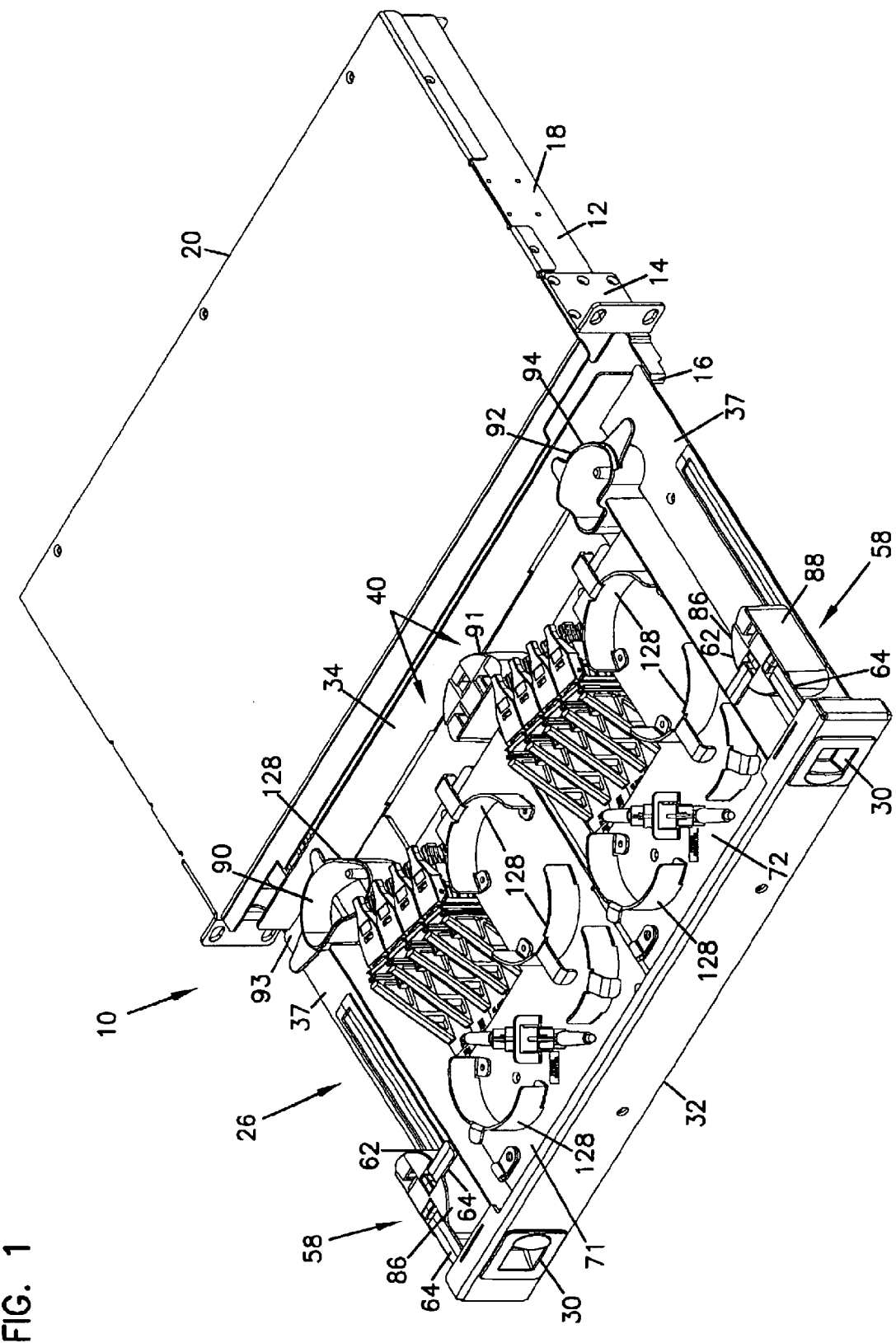
FIG. 1 is a perspective view of a cable management panel or module in accordance with the present invention, shown with the drawer in the open position.

A cable management panel or module 10 according to the present invention is shown in FIGS. 1–4. Panel 10 includes a frame or chassis 12 with side brackets 14 for mounting to a rack, cabinet, enclosure, or other mounting fixture. Chassis 12 includes a front 16, opposed sides 18, and a rear 20. Sides 18 each include cable access openings 22 (FIG. 4) for cables entering or exiting chassis 12. Chassis 12 further includes one or more drawers 26 that slide horizontally during use to access the interior of a selected drawer.

Figure 2:
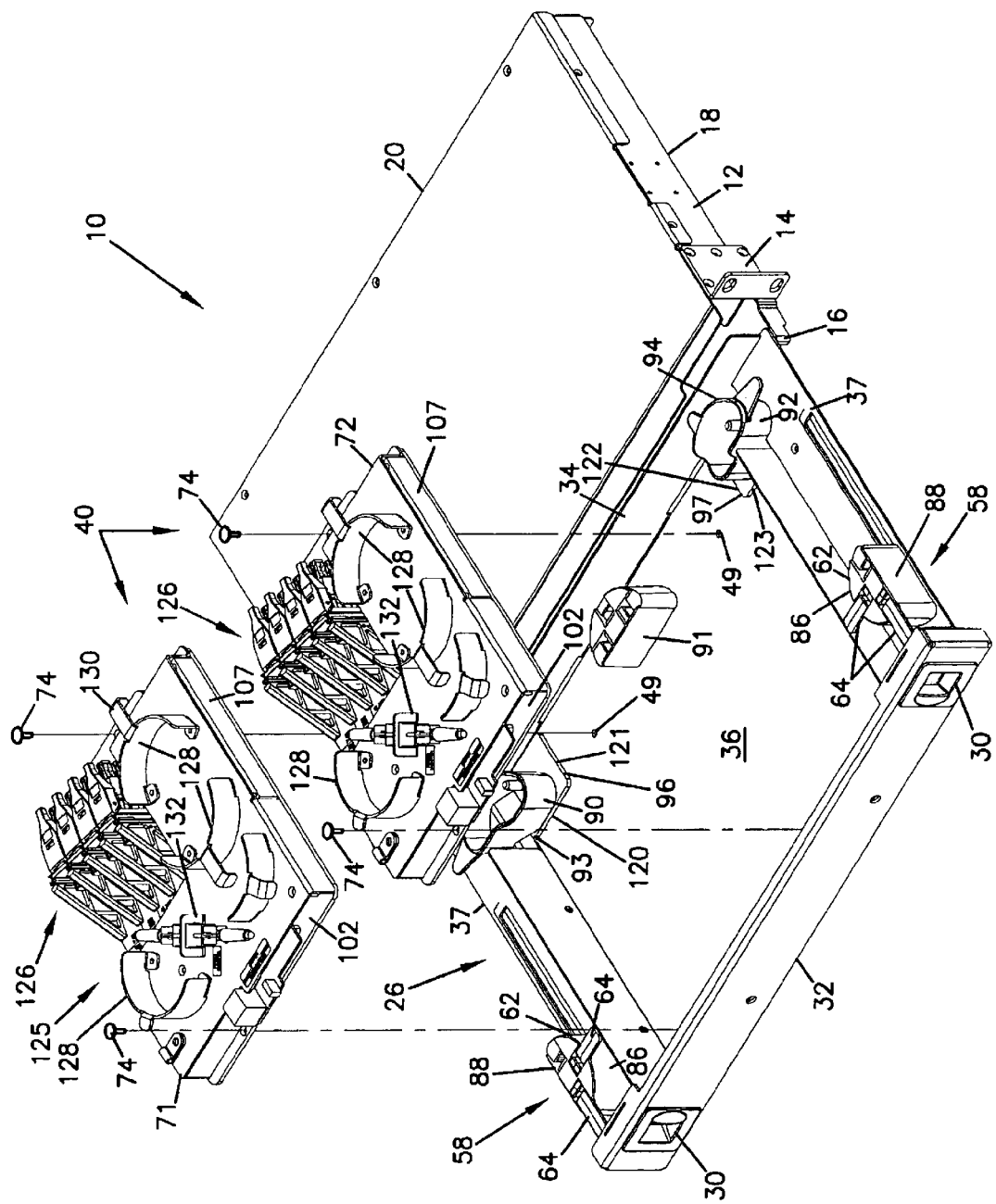
FIG. 2 is an exploded perspective view of the cable management panel of FIG. 1 including the drop-in plates removed from the drawer.

Each drawer 26 includes cable management structure. Examples of cable management structure include devices for storing the cables or connecting the cables to other cables and/or fiber optic devices, such as attenuators, couplers, switches, wave divisions multiplexers (WDMs), splitters/combiners, or splices. Drawers 26 are slideable relative to chassis 12 via two drawer slides on opposite sides of chassis 12. Each drawer 26 includes two latches 30 for latching the drawer 26 in the closed position. Each drawer 26 further includes a front 32, a rear 34, and a base 36 (FIG. 2). Open sides 37 allow for cable entry and exit and prevent cable damage during sliding movement of drawers 26 when accessing the cables and the connectors or other devices in the drawer. The cable guides and radius limiters described below are provided so as to protect the cables and limit bends from going below the minimum bend radius of the cable. The cable retention tabs also described below help keep the cables in place once positioned under the tabs by the user.

Each drawer interior is sized for receiving cable management and/or distribution structure. When the drawer is in the closed position, the cables and management or distribution structures in the interior are protected. In the preferred embodiments, the structure can be conveniently mounted on at least two tray inserts that drop into the interior of drawer 26. This allows for convenient structuring of drawer 26 to serve one or more desired functions in module 10. FIGS. 1–6 show one preferred embodiment of tray inserts or drop-in plates 40 in accordance with the present invention. The tray inserts 40 can be customized as the particular needs vary for panel 10. While a number of tray inserts 40 can be used, in the particular embodiment illustrated, there are two tray inserts 71,72.

Preferably, the individual drawers 26 are constructed as stackable and linkable sub-modules, each with a sub-chassis. Such modularity also allows for ease of use for a variety of different needs for the cable management system. Brackets 14 link the sub-chassis together. This is described in commonly assigned U.S. patent application Ser. No. 09/649,398 filed on Aug. 28, 2000. The Ser. No. 09/649,398 application as well as commonly assigned application Ser. No. 09/490,379 filed on Jan. 24, 2000 is incorporated by reference herein.

In FIG. 2, fasteners (screws) 74 in holes 49 are shown used to secure tray inserts 40 to drawers 26. In alternative embodiments, one or more latches can be used to releasably mount each tray insert 40 to drawer 26. This is also shown in U.S. application Ser. No. 09/649,398 incorporated by reference.

Take-up mechanism 58 includes a push member or radius limiter 62, preferably shaped as a half-moon or semi-circle, each with the curved portion 86 facing inwardly, and the planar portion 88 facing outwards. Radius limiter 62 includes a plurality of tabs 64 for cable retention. Radius limiter 62 is moveably mounted relative to chassis 12 and drawer 26. Radius limiter 62 acts as a guide for cables passing through access opening 22 on each side of drawer 26.

In preferred embodiments, the drawer 26 includes a plurality of radius limiters 90, 91, 92 mounted therein. In the particular configuration shown, the radius limiters 90 and 92 are mounted, respectively, in rear corners 93, 94 of the drawer 26. The radius limiter 91 is depicted as being mounted midway between radius limiter 90 and 92. In other words, radius limiter 91 is shown as mounted centrally and adjacent to the rear 34 of the drawer 26. The radius limiters 90, 92 are mounted on protrusions 96, 97. In preferred embodiments, the protrusions 96, 97 cooperate with the trays 40 to help orient the trays 40 in a proper location within the drawer 26.

Figure 3:
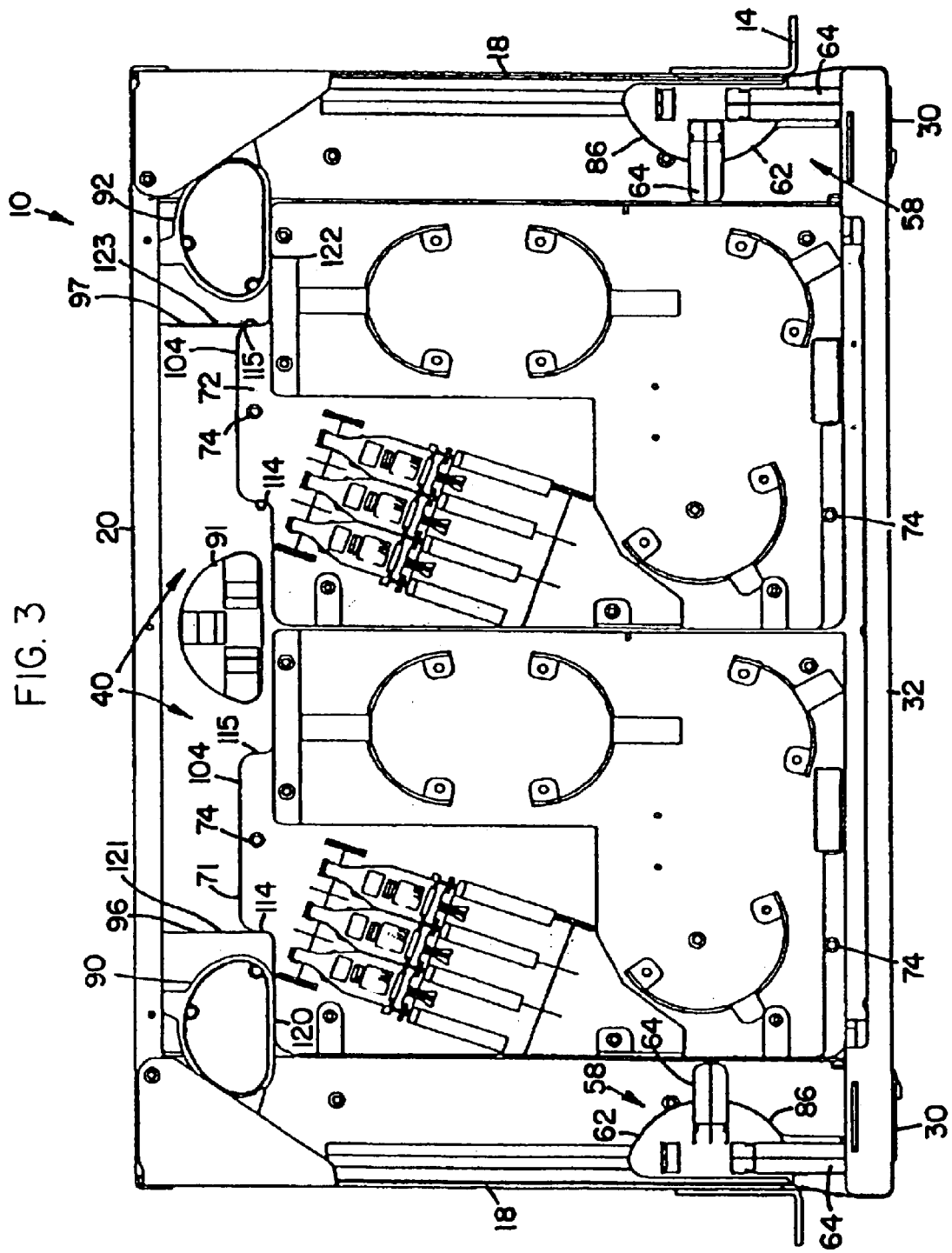
FIG. 3 is a top plan view of the cable management panel with the drawer in a closed position and with the cover removed.
Figure 4:
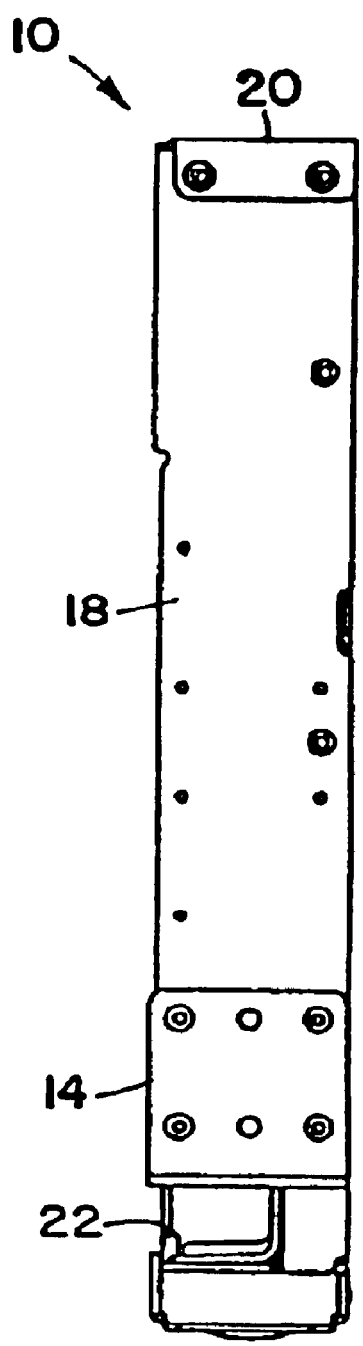
FIG. 4 is a right side elevational view of the cable management panel depicted in FIG. 3.
Figure 5:
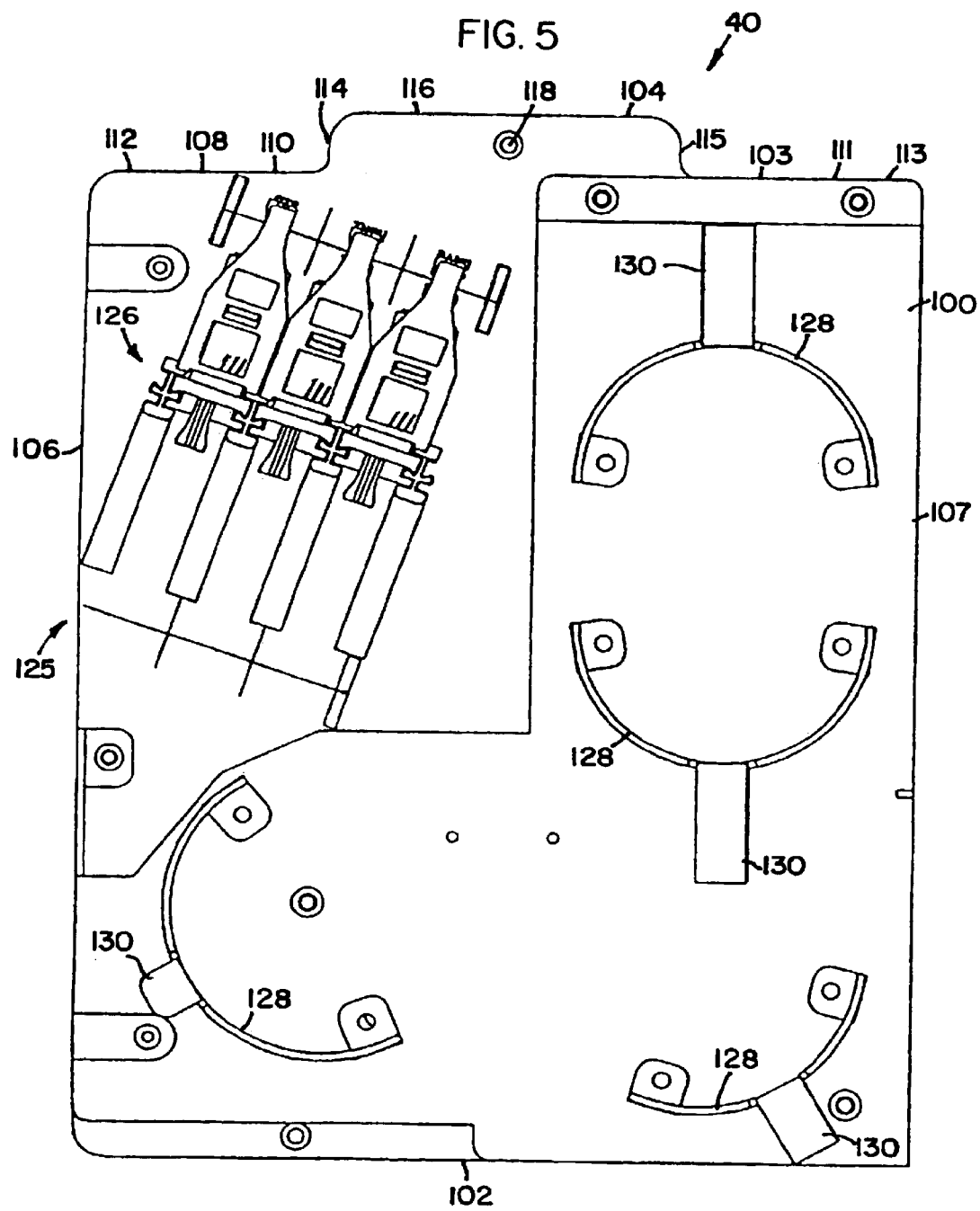
FIG. 5 is a top plan view of one of the drop in plates used in the cable management panel depicted in FIGS. 1–3.
Figure 6:
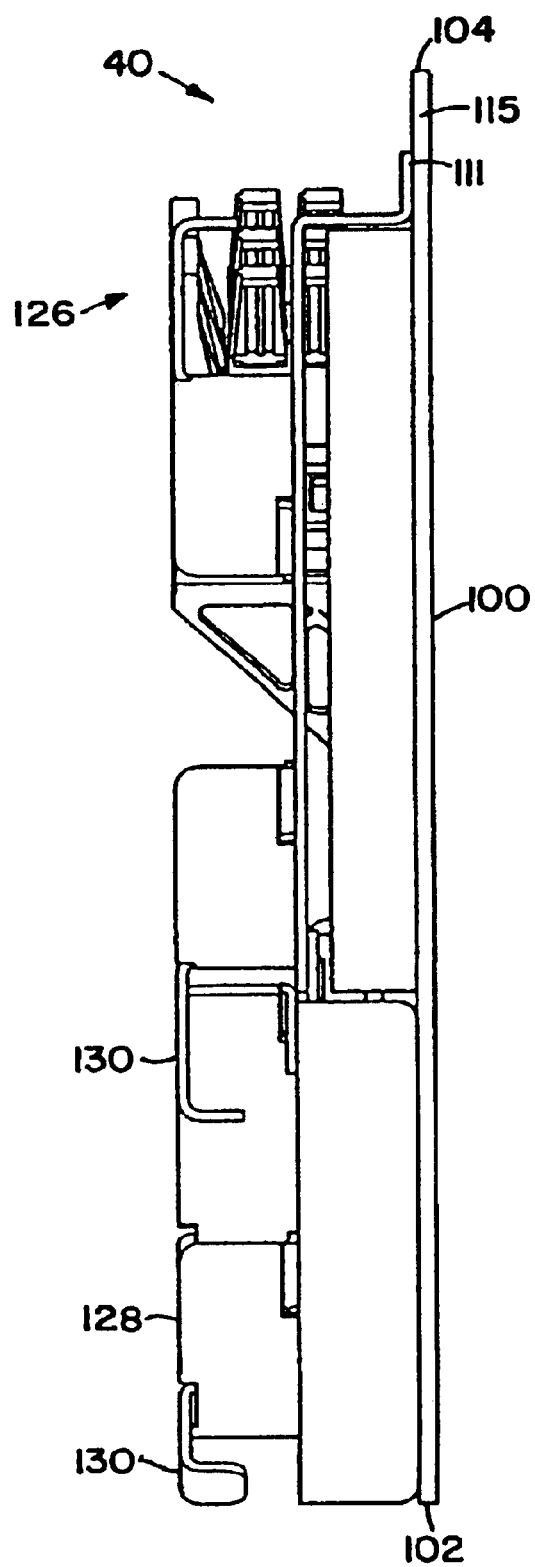
FIG. 6 is a right side elevational view of the drop-in plate depicted in FIG. 5.

Referring now to FIGS. 3 and 5, tray insert 40 includes a base 100 including a flat front 102. While the front 102 is shown as being straight or flat, in alternate embodiments, of course, it could have other shapes. The base 100 also includes a rear surface 103 and a pair of side edges 106, 107 extending between the front 102 and rear 103. In the embodiment shown in FIG. 5, the side edges 106, 107 are straight. In other embodiments, the side edges could have other shapes.

As can be seen in FIGS. 3 and 5, the rear surface 103 has a non-straight edge 108. In particular, the rear surface 103 includes a projection 104 extending therefrom. On each side of the projection 104 is a recessed portion 110, 111. Each of the recessed portions 110, 111 includes, in the preferred embodiment shown, an edge 112, 113, which are shown as being straight, but could be non-straight in other embodiments. Extending from the edges 112, 113 are side portions 114, 115 of the projection 104. In the particular embodiment illustrated, the side portions 114, 115 are perpendicular to the edges 112, 113. Extending between the side portions 114, 115 is a projection edge 116. In this embodiment, the edge 116 is shown as straight, but could be other shapes in other embodiments. In FIG. 5, it is shown how the projection 104 defines a fastener aperture 118. In the example embodiment shown, one of the screws 74 passes through the aperture 118 and into the holes 49 to secure the trays 40 to the base 36 of the drawer 26.

Attention is now directed to FIG. 3. In FIG. 3, it can be seen how the recessed portions 110, 111 cooperate with the protrusions or bases 96, 97 of the radius limiters 90, 92 in the drawer 26. In particular, the bases 96, 97 define, at least, a pair of edges 120, 121 (for base 96) and 122, 123 (for base 97). In the preferred embodiment shown, the edges 120 and 121 are perpendicular relative to each other, while the edges 122 and 123 are perpendicular relative to each other. The edges 120, 121, 122, 123 provide stops or engagement surfaces to accommodate engagement with the trays 40. In particular, the edges 120, 122 engage one of the recessed portions 110, 111, while the edges 121, 123 engage one of the side portions 114, 115 of the rear projection 104.

By viewing FIG. 5, it should be appreciated that the trays 40 are configured to be symmetrical, such that the trays 40 can be fit within the drawer 26 to engage either the base 96 or the base 97—that is, the trays 40 are not left handed and right handed. This contributes to flexibility in the desired configuration for the system by the user. Preferably, the projection 104 is centered between the recessed portions 110, 111.

One of the advantages of the drop-in plates 40 is that there is flexibility to the set up of the system. In any given drawer 26, two identical plates 40 or two different plates 40 can be used. Once installed, the end user can change her configuration by replacing one plate 40 with a plate 40 having different components.

Each of the plates 40 can accommodate different components 125. Examples of such components 125 include: couplers, filters, optical assemblies, integrated optics, storage trays, attenuators, wave length division multiplexers, radius limiters, adapters, LEDs, and other fiber management or optical components. In the examples shown in FIGS. 1–6, the trays 40 include a plurality of adapters 126 and a plurality of radius limiters 128. The radius limiters 128 depicted include tabs 130 for cable retention. In the embodiment of FIGS. 1 and 2, the trays 40 also show light emitting diodes (LED) 132. For purposes of clarity, the LEDs 132 are not depicted in FIGS. 3–6.

The configuration of the interior of drawer 26 can vary as the desired functions for panel 10 vary. The examples of FIGS. 1–6 are provided to show some of the variations possible.

In use, when it is desired to change the configuration of the drawer 26, the user can remove and replace the trays 40 from the drawer 26. The old tray 40 with the old configuration of fiber management components 125 is removed by releasing the attachment between the trays 40 and the drawer 26. In the embodiment shown, this is done by removing the screws 74. The old tray 40 is replaced with a new tray 40 having the new, desired components 125 mounted thereon The new tray 40 is mounted within the drawer 26 and secured thereto. In the embodiment shown, the tray 40 is secured by mounting the fastener 74 through the tray 40 and into the drawer 26. When mounting the new tray 40, the recessed portion 110 or 111, as appropriate, is mounted relative to the appropriate base 96, 97 by aligning the edge 112 or 113 against the edge 120 or 122. Also, the edge 114 or 115 is aligned relative to the edge 121 or 123. This will align the projection 104 in the appropriate location relative to the fastener hole 49, lining up the fastener hole 118 in the tray 40 relative to the hole 49 to permit the fastener 74 to extend therethrough.

While the embodiments illustrated show only two trays 71, 72, it is contemplated that more than two trays 40 may also be used. It is contemplated that three, four, or more trays 40 can be used, depending upon the particular circumstances.

The above specification, examples and data provide a complete description of the manufacture and use of the invention. Since many embodiments of the invention can be made without departing from the spirit and scope of the invention, the invention resides in the claims hereinafter appended.

What is claimed is:

1. A cable management panel comprising:
   (a) a chassis;
   (b) a drawer slidably mounted within the chassis, the drawer slideable between a first position with the drawer fully inserted within the chassis and a second position with the drawer extended from the interior of the chassis;
      (i) the drawer and the chassis defining an access location allowing entry of optical fiber cable into the chassis and the drawer; and
   (c) at least a first and second drop-in plate operably mounted in the drawer; and
   (d) a securing arrangement that provides removable securement of the first and second drop-in plates to the drawer;

(i) wherein the securing arrangement permits selective removal of each of the first and second drop-in plates;

(ii) wherein each of the first and second drop-in plates is capable of accommodating selected fiber management components thereon.

2. A cable management panel according to claim 1 wherein:

(a) each of the first and second drop-in plates includes fiber management components thereon.

3. A cable management panel according to claim 2 wherein:

(a) the drawer includes at least a first and a second protrusion; and (b) each of the first and second drop-in plates defines at least a single recessed portion to accommodate one of the first and second protrusions.

4. A cable management panel according to claim 3 wherein:

(a) each of the first and second drop-in plates includes a projection adjacent to the at least single recessed portion.

5. A cable management panel according to claim 2 wherein:

(a) each of the first and second drop-in plates includes:

(i) a front surface, an opposite rear surface, and a pair of side edges extending between the front and rear surface; and (A) the rear surface defining a pair of recessed portions with a projection extending therebetween.

6. A cable management panel according to claim 5 wherein:

(a) the securing arrangement includes fastener structure, the projection of each of the first and second drop-in plates defining said fastener structure to accommodate removable securement of the first and second drop-in plates to the drawer.

7. A cable management panel according to claim 5 wherein:

(a) the drawer includes a first and a second protrusion;

(i) each of the first and second protrusions being adjacent to one of the recessed portions of the first and second drop-in plates.

8. A cable management panel according to claim 2 wherein:

(a) the fiber management components comprise at least one of: radius limiters, adapters, and LEDs.

9. A cable management panel according to claim 1 wherein:

(a) the access location allows entry of optical fiber cable into a side of the chassis and the drawer.

10. A cable management panel according to claim 1 further including:

(a) a cable take-up mechanism including a push member movably mounted on the drawer and movable from a first position on the drawer toward a second position on the drawer which is forward of the first position as the drawer is moved from the second position to the first position, the push member also movably mounted to the chassis.

11. The cable management panel according to claim 1 wherein:

(a) the first and second drop-in plates are positioned in a side-by-side relationship when removably secured to the drawer.

12. The cable management panel according to claim 1 wherein:

(a) the securing arrangement permits selective removal of each one of the first and second drop-in plates without removal of the other plate.

13. A drop-in tray for use with a cable management panel; the tray comprising:

(a) a base; the base defining a front edge, an opposite rear edge, and a pair of base side edges extending between the front and rear edges;

(i) said rear edge including a first and a second recessed portion with a projection extending therebetween, the projection extending in a direction parallel to a plane defined by the base;

(A) wherein said projection is centered between said first and second recessed portions; and (b) at least one fiber management component mounted on the base.

14. A tray according to claim 13 wherein:

(a) said projection defines a hole for accommodating a fastener.

15. A tray according to claim 14 wherein:

(a) said base defines at least a second hole for accommodating a fastener.

16. A tray according to claim 13 wherein:

(a) said first and second recessed portions each include straight edges;

(b) said projection includes a pair of projection side edges angled relative to the straight edges of the first and second recessed portions; the projection further including a projection edge extending between the projection side edges.

17. A tray according to claim 16 wherein:

(a) the base front edge, and the base side edges each being straight; and (b) the at least one fiber management component includes at least one of: an adaptor; a radius limiter; and an LED.

18. A method of providing fiber management components in a cable management panel; the method comprising:

(a) providing a cable management panel including a drawer slidably mounted within a chassis;

(b) operably mounting at least two drop-in trays in the drawer; each of the drop-in trays including a fiber management component; and (c) selectively removing one of the drop-in trays from the drawer, each of the drop-in trays being removable without removal of the other tray.

19. A method according to claim 18 wherein:

(a) said step of operably mounting includes aligning a recessed portion in each of the drop-in trays with a protrusion in the drawer; and (b) securing each of the drop-in trays to the drawer by inserting a fastener through a projection in each of the drop-in trays; the projection being immediately adjacent to the recessed portion.

20. A method according to claim 18 further comprising:

(a) removing only one of the drop-in trays from the drawer and replacing it with a new drop-in tray having a fiber management component.

* * * * *